United States Patent
Ohtani

(10) Patent No.: US 9,182,032 B2
(45) Date of Patent: Nov. 10, 2015

(54) LUBRICATION STRUCTURE OF GEAR CHANGE MECHANISM

(71) Applicant: HONDA MOTOR CO., LTD., Tokyo (JP)

(72) Inventor: Takashi Ohtani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/607,072

(22) Filed: Jan. 28, 2015

(65) Prior Publication Data
US 2015/0219205 A1 Aug. 6, 2015

(30) Foreign Application Priority Data

Jan. 31, 2014 (JP) ................................ 2014-017334

(51) Int. Cl.
| | | |
|---|---|---|
| *F01M 9/00* | (2006.01) | |
| *F16H 57/04* | (2010.01) | |
| *F16N 21/00* | (2006.01) | |
| *F16H 63/34* | (2006.01) | |

(52) U.S. Cl.
CPC ........ *F16H 57/0465* (2013.01); *F16H 57/0446* (2013.01); *F16H 63/3483* (2013.01)

(58) Field of Classification Search
CPC ............ F16H 2061/0037; F16H 41/30; F16H 57/0434
USPC ......................................... 474/6.12, 6.19, 6.1
See application file for complete search history.

(56) References Cited

U.S. PATENT DOCUMENTS

| | | | | |
|---|---|---|---|---|
| 1,987,277 A | * | 1/1935 | Von Wangenheim .... | B61K 3/02 184/3.2 |
| 2,012,082 A | * | 8/1935 | Hieber ................... | B60K 41/00 184/6.14 |
| 2,068,391 A | * | 1/1937 | Acker ..................... | F16N 13/12 184/7.4 |
| 2,183,485 A | * | 12/1939 | Butzbach ............ | F16H 61/0293 184/6.12 |
| 2,220,197 A | * | 11/1940 | Ariens ...................... | F16H 3/16 184/6.12 |
| 2,530,860 A | * | 11/1950 | Christensen ........... | D05B 71/02 112/256 |
| 2,628,636 A | * | 2/1953 | Brockman ............. | A01D 41/12 137/625.11 |

(Continued)

FOREIGN PATENT DOCUMENTS

| | | |
|---|---|---|
| JP | 2011-089597 | 5/2011 |
| JP | 2012-013184 | 1/2012 |

*Primary Examiner* — Henry Liu
(74) *Attorney, Agent, or Firm* — Mori & Ward, LLP

(57) ABSTRACT

A lubrication structure of a gear change mechanism includes an actuation valve, a valve body, a detent member, and an elastic contact member. The actuation valve is to set the gear change mechanism to a selected shift position status. The valve body is to house the actuation valve. The detent member is disposed in a vicinity of the valve body and is movable by an operation of the actuation valve. The valve body includes a supply port to supply a hydraulic oil to the detent member. The actuation valve is to communicate the supply port and a drain oil passage in the valve body with each other in a case where a predetermined shift position is selected. The elastic contact member is engaged to one of a plurality of groove portions provided in the detent member.

7 Claims, 2 Drawing Sheets

(56) References Cited

U.S. PATENT DOCUMENTS

| | | | | |
|---|---|---|---|---|
| 2,747,431 A * | 5/1956 | Roche | F16H 47/08 | 184/6 |
| 2,793,714 A * | 5/1957 | Luenberger | F16D 41/00 | 184/104.1 |
| 2,865,227 A * | 12/1958 | Kelley | F16H 47/08 | 137/58 |
| 2,912,884 A * | 11/1959 | Christenson | B62D 11/10 | 180/292 |
| 2,950,629 A * | 8/1960 | Holdeman | F16D 67/00 | 184/6.12 |
| 3,013,574 A * | 12/1961 | Breting | F16H 61/0262 | 137/115.14 |
| 3,038,353 A * | 6/1962 | Roche | F16H 47/08 | 184/6.12 |
| 3,075,690 A * | 1/1963 | Luenberger | F16H 57/0421 | 184/6.12 |
| 3,714,836 A * | 2/1973 | Pierce, Jr. | F16H 41/24 | 475/120 |
| 3,822,765 A * | 7/1974 | Heller | B62D 11/08 | 180/6.7 |
| 4,147,234 A * | 4/1979 | Lewkowicz | F16N 7/38 | 184/6.26 |
| 4,286,691 A * | 9/1981 | Stong | F16N 13/22 | 184/6.28 |
| 4,506,564 A * | 3/1985 | Coutant | F16H 61/0021 | 477/158 |
| 4,522,086 A * | 6/1985 | Haley | B60W 30/18 | 474/18 |
| 4,563,918 A * | 1/1986 | Sugano | F16H 61/0021 | 477/159 |
| 4,864,823 A * | 9/1989 | Ikejiri | F16H 61/40 | 184/7.1 |
| 5,046,263 A * | 9/1991 | Yoshida | G01F 23/04 | 184/108 |
| 5,634,530 A * | 6/1997 | Maekawa | B60K 17/344 | 184/11.2 |
| 6,401,870 B2* | 6/2002 | Roy | F16N 7/38 | 184/55.1 |
| 6,631,651 B2* | 10/2003 | Petrzik | F16H 61/0025 | 184/27.2 |
| 6,668,978 B2* | 12/2003 | Fessler | F16H 57/0434 | 184/6.1 |
| 6,877,531 B2* | 4/2005 | Few | F01M 11/04 | 141/18 |
| 7,036,634 B2* | 5/2006 | Wheeler | F16H 41/30 | 184/6.12 |
| 7,980,343 B2* | 7/2011 | Mogi | B60K 17/12 | 180/65.6 |
| 2001/0030083 A1* | 10/2001 | Roy | F16N 7/38 | 184/6.26 |
| 2003/0066710 A1* | 4/2003 | Fessler | F16H 57/0434 | 184/6.1 |
| 2004/0108168 A1* | 6/2004 | Bathe | F16H 57/042 | 184/6.12 |
| 2004/0188180 A1* | 9/2004 | Wheeler | F16H 41/30 | 184/6.12 |
| 2006/0054407 A1* | 3/2006 | Wirth | F16H 57/05 | 184/6.12 |
| 2010/0018805 A1* | 1/2010 | Sachdev | F01M 5/025 | 184/6.3 |

* cited by examiner

LUBRICATION STRUCTURE OF GEAR CHANGE MECHANISM

CROSS-REFERENCE TO RELATED APPLICATIONS

The present application claims priority under 35 U.S.C. §119 to Japanese Patent Application No. 2014-017334, filed Jan. 31, 2014, entitled "Lubrication Structure of Gear Change Mechanism." The contents of this application are incorporated herein by reference in their entirety.

BACKGROUND

1. Field

The present disclosure relates to a lubrication structure of a gear change mechanism.

2. Description of the Related Art

Vehicles including a transmission, such as an automatic transmission, are provided with a gear change mechanism for changing gears (shifting gears) by switching a supply destination of an oil pressure in accordance with an operation of a selector lever by a driver.

As an example of such a gear change mechanism, there is a parking mechanism that locks an output shaft of a transmission coupled to drive wheels when the vehicle is stopped. The above parking mechanism includes an actuation valve that actuates the parking mechanism in accordance with the shift position selected by the driver, a valve body that houses the actuation valve, a detent plate that pivots upon switching of the actuation valve, a parking rod that drives a parking pole by being displaced together with the pivoting of the detent plate, a parking gear that is disposed on the output shaft and to which the parking pole engages (meshes), and a detent arm that elastically engages with the detent plate.

In the parking mechanism described above, when the shift position is shifted to a parking range (P range) by an operation of the selector lever by the driver, the detent plate is pivoted to a parking position with the actuation valve. With the above, the cam body provided at the distal end of the parking rod drives the parking pole; accordingly, the parking pole meshes with the parking gear on the output shaft and the output shaft is locked.

Incidentally, Japanese Unexamined Patent Application Publication No. 2011-89597 and Japanese Unexamined Patent Application Publication No. 2012-13184 each illustrate a lubrication structure for lubricating components of a gear change mechanism, such as the parking mechanism described above. In other words, in conventional lubrication structures, the components of the gear change mechanism are lubricated by splashed oil that has been scraped up by the gears (Japanese Unexamined Patent Application Publication No. 2012-13184) or the components of the gear change mechanism are lubricated by dropping oil from a gutter that is provided in a wall surface of a case, the gutter temporarily accumulating oil inside the case that has been scraped up by the gears (Japanese Unexamined Patent Application Publication No. 2011-89597).

SUMMARY

According to one aspect of the present invention, a lubrication structure of a gear change mechanism includes an actuation valve, a valve body, a detent member, and an elastic contact member. The actuation valve displaces, in accordance with a shift position selected by a driver of a vehicle, the gear change mechanism to the shift position that has been selected. The valve body houses the actuation valve. The detent member is disposed in a vicinity of the valve body and is interlocked with an operation of the actuation valve. The elastic contact member is elastically engaged in a selective manner to a plurality of groove portions formed in the detent member. The valve body includes a supply port that supplies a hydraulic oil to the detent member. The actuation valve communicates the supply port and a drain oil passage in the valve body with each other when the driver selects a predetermined shift position.

According to another aspect of the present invention, a lubrication structure of a gear change mechanism includes an actuation valve, a valve body, a detent member, and an elastic contact member. The actuation valve is to set the gear change mechanism to a selected shift position status. The valve body is to house the actuation valve. The detent member is disposed in a vicinity of the valve body and is movable by an operation of the actuation valve. The valve body includes a supply port to supply a hydraulic oil to the detent member. The actuation valve is to communicate the supply port and a drain oil passage in the valve body with each other in a case where a predetermined shift position is selected. The elastic contact member is engaged to one of a plurality of groove portions provided in the detent member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 2A and 2B are diagrams for describing the operations of a parking actuation valve and the parking mechanism in which FIG. 2A illustrates a state in which a parking position is selected and FIG. 2B illustrates a state in which a position other than the parking position is selected.

DESCRIPTION OF THE EMBODIMENTS

Figure 1:
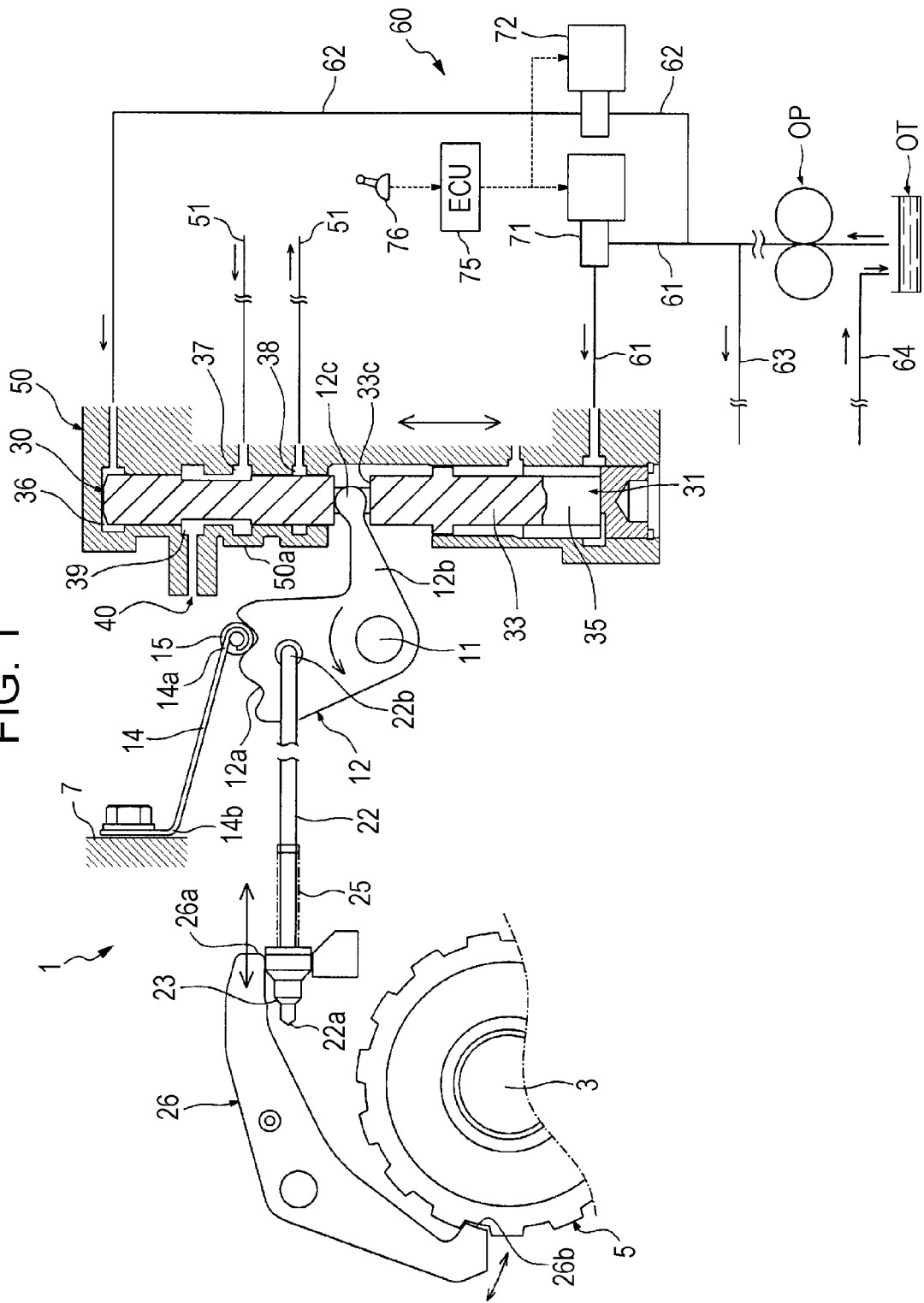
FIG. 1 is a schematic diagram illustrating an exemplary configuration of a parking mechanism provided with a lubrication structure according to an exemplary embodiment of the present disclosure.

The embodiments will now be described with reference to the accompanying drawings, wherein like reference numerals designate corresponding or identical elements throughout the various drawings.

Hereinafter, an exemplary embodiment of the present disclosure will be described in detail with reference to the accompanying drawings. FIG. 1 is a schematic diagram illustrating an exemplary configuration of a parking mechanism provided with a lubrication structure according to an exemplary embodiment of the present disclosure. A parking mechanism (a gear change mechanism) 1 of a transmission illustrated in FIG. 1 includes a parking actuation valve (an actuation valve) 30 that operates in accordance with an operation of a selector lever 76 by a driver, a tabular detent plate (a detent member) 12 that interlocks with the operation of the parking actuation valve 30 and that pivots about a control shaft 11, a detent arm (an elastic contact member) 14 and a detent roller (an elastic contact member) 15 that elastically engage with the detent plate 12, a parking rod 22 that is pivotally coupled to the detent plate 12, a parking gear 5 that is disposed on an output shaft 3 of the transmission, and a parking pole 26 that engages with the parking gear 5.

A detent portion (groove portions) 12a is formed in an outer peripheral edge of the detent plate 12. The detent portion 12a includes two groove portions (valley portions) that correspond to a parking position (a P position) and a position other than the parking position of the parking mechanism 1. The detent roller 15 that is provided at a distal end of the detent arm 14 elastically engages with the detent portion 12a. A proximal end portion 14b of the detent arm 14 is fixed to a transmission case 7 that is a member on a fixed side, and a portion between the proximal end portion 14b and a distal end portion 14a is configured to be elastically deformed. The detent roller 15 is biased towards the detent portion 12a with a biasing force owing to an elastic force of the detent arm 14. Accordingly, when the detent plate 12 is pivoted upon operation of the parking actuation valve 30, the detent roller 15 is sequentially engaged with each of the groove portions of the detent portion 12a such that the detent plate 12 is sequentially pivoted by a predetermined angle.

The parking rod 22 is a rodlike member that extends towards the parking pole 26 from the detent plate 12, and an end portion 22b on the proximal side is pivotally coupled to the detent plate 12. A cam body 23 is disposed in the vicinity of a distal end 22a of the parking rod 22. The cam body 23 is a member that is formed in a tapered substantially columnar shape in which the parking rod 22 is passed through the center thereof. The cam body 23 is capable of advancing and retreating in the axial direction at the vicinity of the distal end 22a side of the parking rod 22. Furthermore, the cam body 23 is biased towards the distal end 22a side of the parking rod 22 with a coil spring 25. Moreover, the lateral surface on the distal end side of the cam body 23 is in contact with and engages with one end portion 26a of the parking pole 26. By driving the parking pole 26 with the cam body 23, the other end portion (an engagement portion) 26b of the parking pole 26 is engaged with the parking gear 5 on the output shaft 3.

The parking actuation valve 30 is built in a valve body (hydraulic control body) 50 that is included in the transmission and is integrally provided with the valve body 50. The parking actuation valve 30 includes a spool 33 that is inserted in a valve hole 31 of a valve body 50, and a plurality of oil pressure ports that are formed in the gap between the spool 33 and the valve hole 31. A first signal pressure port 35 provided around one end portion of the spool 33 (an end portion on the lower side of the drawing), a second signal pressure port 36 provided around the other end portion of the spool 33 (an end portion on the upper side of the drawing), an inflow port 37 into which a hydraulic oil from a drain oil passage 51 in the valve body 50 flows, an outflow port 38 for returning the hydraulic oil that has flowed therein from the inflow port 37 to the drain oil passage 51, and a lubrication port 39 for supplying the hydraulic oil, which has flowed therein from the inflow port 37, as a hydraulic oil (a lubricating oil) for lubricating the parking mechanism 1 are provided as the plurality of oil pressure ports.

Furthermore, an arm portion 12b that protrudes towards the parking actuation valve 30 is provided in the detent plate 12. A spherical portion 12c at a distal end of the arm portion 12b is engaged in a swingable manner to an engagement groove 33c that includes a recess provided in the spool 33 of the parking actuation valve 30.

Moreover, a supply port 40 that is provided at a downstream end of the lubrication port 39 is disposed above (at a position right above) the detent portion (groove portions) 12a of the detent plate 12 such that the hydraulic oil (the lubricating oil) dropping from the supply port 40 is supplied to the detent portion 12a of the detent plate 12 (a portion where the detent roller 15 is elastically engaged).

In other words, a lateral side 50a of the valve body 50 is disposed above (at a position right above) the detent plate 12 and the detent roller 15, and the supply port 40 of the lubrication port 39 is open in the lateral side 50a.

A hydraulic circuit 60 for controlling the parking actuation valve 30 includes an oil tank OT in which the hydraulic oil accumulates, an oil pump OP that suctions the hydraulic oil inside the oil tank OT, a first oil passage 61 for guiding the hydraulic oil exiting the oil pump OP to the first signal pressure port 35 through a first shift valve 71, a second oil passage 62 for guiding the hydraulic oil exiting the oil pump OP to the second signal pressure port 36 through a second shift valve 72, and a third oil passage 63 for guiding the hydraulic oil exiting the oil pump OP to the inside of the valve body 50 and to portions inside the transmission.

The hydraulic oil suctioned by the oil pump OP is supplied to the inside of the valve body 50 from the third oil passage 63 and is used to apply a hydraulic oil pressure that actuates the valve mechanism (not shown), and, furthermore, is supplied to the bearing portions that support the rotating shafts included in the gear mechanism (not shown) inside the transmission as hydraulic oil for lubrication. Then, the hydraulic oil for lubrication that has been supplied to the valve mechanism and the gear mechanism is returned to the oil tank OT through a return oil passage 64.

Furthermore, the hydraulic circuit 60 includes an ECU (controller) 75 for controlling the operations of the first and second shift valves 71 and 72. The ECU 75 is configured so that an operation signal of the selector lever 76 is input thereto. Furthermore, the ECU 75 is configured to output a control signal to each of the first shift valve 71 and the second shift valve 72. Accordingly, on the basis of the operation signal of the selector lever 76, the ECU 75 controls an on-and-off switching of an oil pressure (a signal pressure) of the hydraulic oil supplied to the first signal pressure port 35 from the first shift valve 71 and an on-and-off switching of an oil pressure (a signal pressure) of the hydraulic oil supplied to the second signal pressure port 36 from the second shift valve 72.

With the above, the spool 33 being slid in the valve hole 31 in the axial direction with the signal pressure that has been controlled in the first shift valve 71 or the second shift valve 72 and that is supplied to the first signal pressure port 35 or the second signal pressure port 36 is capable of advancing and retreating the parking rod 22 through the arm portion 12b by pivoting the detent plate 12. Furthermore, the spool 33 sliding inside the valve hole 31 in the axial direction allows the communication state of the inflow port 37 to be switched so that the inflow port 37 is selectively in communication with either one of the outflow port 38 and the lubrication port 39.

Figure 2A:
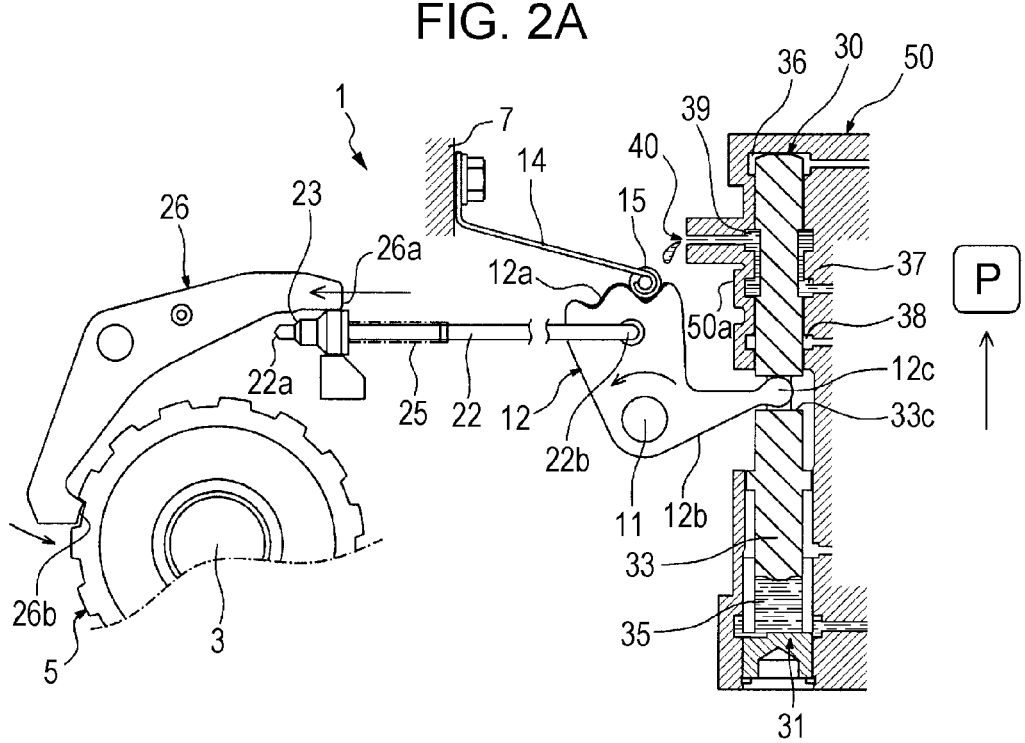
Figure 2B:
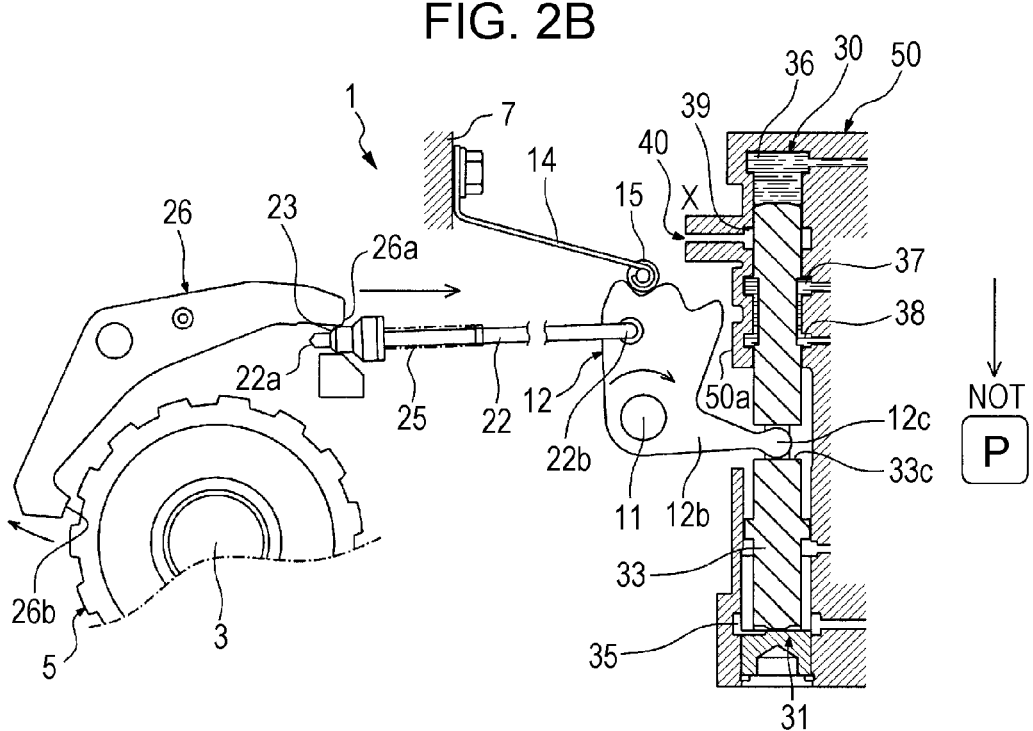

FIGS. 2A and 2B are diagrams for describing the operations of the parking mechanism 1 and the parking actuation valve 30 in which FIG. 2A illustrates a state in which the parking position is selected and FIG. 2B illustrates a state in which a position other than the parking position is selected. In the parking mechanism 1 with the above configuration, when a driver operates the selector lever 76 in a vehicle interior, a signal corresponding to the operation of the selector lever 76 is output to the ECU 75. The ECU 75 that has received the signal controls the opening and closing of the first shift valve 71 and the second shift valve 72 so as to actuate the spool 33 of the parking actuation valve 30. With the above, the detent plate 12 that is coupled to the spool 33 of the parking actuation valve 30 is pivoted.

In other words, when the selector lever 76 is positioned in a range other than the P range (for example, a D, N, or R range), the first shift valve 71 is switched to an off state and the second shift valve 72 is switched to an on state with the control executed by the ECU 75. With the above, as illustrated in FIG. 2B, the hydraulic oil is only supplied to the second signal pressure port 36 among the first signal pressure port 35 and the second signal pressure port 36 of the parking actuation valve 30; accordingly, the spool 33 of the parking actuation valve 30 is displaced to the first signal pressure port 35 side (the lower side of the figure) so as to be positioned in a position (a non-parking position) other than the parking position (the P position). With the above, the detent plate 12 is pivoted clockwise in FIG. 2B such that the cam body 23 is positioned apart from the parking pole 26. Accordingly, the parking pole 26 is in a retreated position so that the engagement portion 26b of the parking pole 26 does not engage with the parking gear 5.

Moreover, in the above state, the inflow port 37 of the parking actuation valve 30 is in communication with the outflow port 38. With the above, the hydraulic oil that has flowed into the inflow port 37 is discharged from the outflow port 38 and is returned to the drain oil passage 51 in the valve body 50. Accordingly, no hydraulic oil is supplied to the lubrication port 39 of the parking actuation valve 30 and no hydraulic oil (lubricating oil) is supplied to the detent plate 12 from the supply port 40.

On the other hand, when the selector lever 76 is shifted to the parking range (the P range), the second shift valve 72 is switched to an off state and the first shift valve 71 is switched to an on state with the control executed by the ECU 75. With the above, as illustrated in FIG. 2A, the hydraulic oil is only supplied to the first signal pressure port 35 among the first signal pressure port 35 and the second signal pressure port 36 of the parking actuation valve 30; accordingly, the spool 33 of the parking actuation valve 30 is displaced to the second signal pressure port 36 side (the upper side of the figure) so as to be positioned in the parking position (the P position). Accordingly, the cam body 23 on the parking rod 22 presses the parking pole 26 so that the engagement portion 26b of the parking pole 26 engages with the parking gear 5 to lock (parking lock) the output shaft 3.

Moreover, in the above state, the inflow port 37 of the parking actuation valve 30 is in communication with the lubrication port 39. With the above, the hydraulic oil that has flowed into the inflow port 37 is discharged from the supply port 40 of the lubrication port 39 and is supplied to the detent portion 12a of the detent plate 12. With the above, the elastically engaged portion between the detent portion 12a and the detent roller 15 can be lubricated.

As described above, the lubrication structure of the parking mechanism 1 of the present exemplary embodiment includes the supply port 40 that supplies the hydraulic oil to the detent portion 12a of the detent plate 12 and the parking actuation valve 30 is configured so that the supply port 40 (the lubrication port 39) and the drain oil passage 51 in the valve body 50 communicate with each other when the driver of the vehicle selects the parking position; accordingly, when the driver selects the parking position, the detent portion 12a of the detent plate 12 is lubricated by the hydraulic oil supplied from the supply port 40. Therefore, the components of the parking mechanism 1 can be lubricated each time the driver selects the parking position.

With the above, the hydraulic oil needed to lubricate the parking mechanism 1 can be obtained in a stable manner without being affected by the range in which the hydraulic oil is splashed by the gear scraping up the hydraulic oil and by the amount of hydraulic oil that is supplied through the inner wall surface of the transmission case; accordingly, the components of the parking mechanism 1 can be disposed inside the transmission case at a high position or at a position that is away from the gears and, thus, the degree of freedom of the layout of the parking mechanism 1 is increased.

Furthermore, in the lubrication structure of the present exemplary embodiment, the supply port 40 is open in the vicinity of the detent plate 12, specifically, a position above (right above) the detent plate 12, such that the hydraulic oil dropping from the supply port 40 is supplied to the detent portion 12a of the detent plate 12. Accordingly, with a simple configuration, the detent plate 12 can be reliably lubricated with the hydraulic oil that has exited the supply port 40.

Furthermore, in the lubrication structure of the present exemplary embodiment, the gear change mechanism subject to lubrication is a parking mechanism 1 that performs parking lock of the vehicle, and when the driver selects the parking position, the parking actuation valve 30 communicates the supply port 40 and the drain oil passage 51 in the valve body 50 with each other.

With such a configuration, each time the driver selects the parking position, the hydraulic oil is supplied from the supply port 40 and, accordingly, the detent plate 12 can be lubricated with the hydraulic oil.

Although an exemplary embodiment of the present disclosure has been described above, the present disclosure is not limited to the exemplary embodiment described above and various modifications can be made within the scope of the technical ideas that are described in the claims, the description, and the drawings. For example, in the exemplary embodiment described above, the parking mechanism 1 that performs parking lock of the vehicle is illustrated as the gear change mechanism subject to lubrication with the lubrication structure according to the present disclosure; however, the gear change mechanism subject to lubrication with the lubrication structure according to the present disclosure may be a gear change mechanism other than a parking mechanism.

The present application describes a lubrication structure that allows the components of the gear change mechanism to be disposed at a high position inside the case and at a position that is away from the gears and that increases the degree of freedom of the layout of the gear change mechanism.

In order to overcome the above issues, the present disclosure discloses a lubrication structure of a gear change mechanism including an actuation valve (30) that displaces a gear change mechanism (1) to a shift position that has been selected in accordance with the shift position selected by a driver of a vehicle, a valve body (50) that houses the actuation valve (30), a detent member (12) that is disposed in the vicinity of the valve body (50) and that is interlocked with an operation of the actuation valve (30), and elastic contact members (14, 15) that are elastically engaged in a selective manner to a plurality of groove portions (12a) formed in the detent member (12), in which the valve body (50) includes a supply port (40) that supplies a hydraulic oil to the detent member (12) and in which the actuation valve (30) communicates the supply port (40) and a drain oil passage (51) in the valve body (50) with each other when the driver selects a predetermined shift position.

According to the lubrication structure of the gear change mechanism of the present disclosure, the valve body includes a supply port that supplies hydraulic oil to the groove portions of the detent member and the actuation valve is configured to communicate the supply port and the drain oil passage in the valve body with each other when the driver selects a predetermined shift position; accordingly, when the driver selects the predetermined shift position, the groove portions of the detent member are lubricated by the hydraulic oil supplied from the supply port. Therefore, the components of the gear change mechanism can be lubricated each time the driver selects the predetermined shift position.

With the above, the hydraulic oil needed to lubricate the gear change mechanism can be obtained in a stable manner without being affected by the range in which the hydraulic oil is splashed by the gear scraping up the hydraulic oil and by the amount of hydraulic oil that is supplied through the inner wall surface of the transmission case; accordingly, the components of the gear change mechanism can be disposed inside the transmission case at a high position or at a position that is away from the gears and, thus, the degree of freedom of the layout of the gear change mechanism is increased.

Furthermore, the lubrication structure described above may be configured so that the supply port (40) is open at a position above the detent member (12) so that the hydraulic oil dropping from the supply port (40) is supplied to the groove portions (12*a*) of the detent member (12).

According to the above, with a simple configuration, the detent member can be reliably lubricated with the hydraulic oil that has exited the supply port.

Furthermore, in the lubrication structure described above, the gear change mechanism is preferably a parking mechanism (1) that performs parking lock of the vehicle and the actuation valve (30) preferably communicates the supply port (40) and the drain oil passage (51) in the valve body (50) with each other when the driver selects the parking position.

According to the above configuration, each time the driver selects the parking position, the hydraulic oil is supplied from the supply port and, accordingly, the detent member can be lubricated with the hydraulic oil.

Note that the reference numerals in the parentheses described above illustrate the reference numerals of the components of the present exemplary embodiment described later as an example of the present disclosure.

According to the lubrication structure of the gear change mechanism of the present disclosure, the components of the gear change mechanism can be disposed at a high position inside the case and at a position that is away from the gears and the degree of freedom of the layout of the gear change mechanism can be increased.

Obviously, numerous modifications and variations of the present invention are possible in light of the above teachings. It is therefore to be understood that within the scope of the appended claims, the invention may be practiced otherwise than as specifically described herein.

What is claimed is:

1. A lubrication structure of a gear change mechanism, comprising:
    an actuation valve that displaces, in accordance with a shift position selected by a driver of a vehicle, the gear change mechanism to the shift position that has been selected;
    a valve body that houses the actuation valve;
    a detent member that is disposed in a vicinity of the valve body and that is interlocked with an operation of the actuation valve; and
    an elastic contact member that is elastically engaged in a selective manner to a plurality of groove portions formed in the detent member, wherein
    the valve body includes a supply port that supplies a hydraulic oil to the detent member, and
    the actuation valve communicates the supply port and a drain oil passage in the valve body with each other when the driver selects a predetermined shift position.

2. The lubrication structure of a gear change mechanism according to claim 1, wherein
    the supply port is open at a position above the detent member, and
    the supply port is configured such that the hydraulic oil that has dropped from the supply port is supplied to the groove portions of the detent member.

3. The lubrication structure of a gear change mechanism according to claim 1, wherein
    the gear change mechanism is a parking mechanism that performs parking lock of the vehicle, and
    the actuation valve communicates the supply port and the drain oil passage in the valve body with each other when the driver selects a parking position.

4. A lubrication structure of a gear change mechanism, comprising:
    an actuation valve to set the gear change mechanism to a selected shift position status;
    a valve body to house the actuation valve;
    a detent member disposed in a vicinity of the valve body and being movable by an operation of the actuation valve, the valve body including a supply port to supply a hydraulic oil to the detent member, the actuation valve being to communicate the supply port and a drain oil passage in the valve body with each other in a case where a predetermined shift position is selected; and
    an elastic contact member engaged to one of a plurality of groove portions provided in the detent member.

5. The lubrication structure of a gear change mechanism according to claim 4, wherein
    the supply port is open at a position above the detent member, and
    the supply port is configured such that the hydraulic oil that is to drop from the supply port is supplied to the plurality of groove portions of the detent member.

6. The lubrication structure of a gear change mechanism according to claim 4, wherein
    the gear change mechanism comprises a parking mechanism to perform parking lock of a vehicle, and
    the actuation valve is to communicate the supply port and the drain oil passage in the valve body with each other in a case where a parking position is selected.

7. The lubrication structure of a gear change mechanism according to claim 6, wherein
    the actuation valve is to prevent the supply port from communicating with the drain oil passage in the valve body in a case where a shift position other than the parking position is selected.

* * * * *